United States Patent
Fliegl, Jr.

(10) Patent No.: US 9,027,980 B1
(45) Date of Patent: May 12, 2015

(54) VEHICLE WITH COVER SYSTEM FOR THE LOAD-CARRYING STRUCTURE

(71) Applicant: Josef Fliegl, Sr., Kastl (DE)

(72) Inventor: Josef Fliegl, Jr., Mühldorf am Inn (DE)

(73) Assignee: Josef Fliegl, Sr. (DE)

( * ) Notice: Subject to any disclaimer, the term of this patent is extended or adjusted under 35 U.S.C. 154(b) by 0 days.

(21) Appl. No.: 14/534,651

(22) Filed: Nov. 6, 2014

(30) Foreign Application Priority Data

Nov. 8, 2013 (DE) .................... 20 2013 105 032 U

(51) Int. Cl.
*B60J 7/00* (2006.01)
*B60J 7/16* (2006.01)
*B65D 88/12* (2006.01)

(52) U.S. Cl.
CPC ............. *B60J 7/1621* (2013.01); *B65D 88/125* (2013.01)

(58) Field of Classification Search
CPC ........ B60J 7/1621; B60J 7/141; B65D 88/125
USPC ................ 296/100.02, 100.06, 100.1, 100.08
See application file for complete search history.

(56) References Cited

U.S. PATENT DOCUMENTS 6,402,233 B1 6/2002 Tseng et al.
2007/0035152 A1* 2/2007 Talbot et al. ............... 296/100.1

FOREIGN PATENT DOCUMENTS

DE 102007043818 B4 6/2009

* cited by examiner

*Primary Examiner* — Joseph D Pape
(74) *Attorney, Agent, or Firm* — Renner Kenner Greive Bobak Taylor & Weber

(57) ABSTRACT

A vehicle has a load-carrying structure limited by end and side walls and open at the top. A cover system covers the load-carrying structure in a closed position, and uncovers it in an open position. The cover system has at least one roof segment, swivelled between the closed position and the open position using at least one swivel mechanism having at least one drive shaft, with the roof segment being rigidly attached to the drive shaft. A drive turns the drive shaft, which is rotatably secured to at least two swivel levers that are able to be swivelled on a shared swivel axis, thus moving the drive axis between its position on the upper longitudinal edge of one of the two side walls and a position that is laterally spaced from the side wall, and aligning the shared swivel axis with the upper longitudinal edge of the side walls.

12 Claims, 9 Drawing Sheets

VEHICLE WITH COVER SYSTEM FOR THE LOAD-CARRYING STRUCTURE

TECHNICAL FIELD

The invention concerns a vehicle with a load-carrying structure that is limited by end and side walls and is open at the top and a cover system to cover the load-carrying structure when in closed position, and uncover it when in open position.

BACKGROUND OF THE INVENTION

Load-carrying structures that are open at the top are primarily used for bulk goods, as well as other goods that can be loaded from above. However, these goods are often sensitive to moisture, or can easily be blown away by the airflow generated during travel. For this reason, cover systems are often used, usually taking the form of sliding or roll-over tarpaulins. However, pulling such tarpaulins over the load opening can be difficult as the mechanism often jams and/or is restricted by the load itself. This means that valuable time may be lost in the case of unexpected downpours or hailstorms.

U.S. Pat. No. 6,402,233 B2 first describes a cover system made of two roof segments as the state of the art; this system can be swivelled between closed position and open position, with each roof segment being rigidly attached to a drive shaft positioned in the region of the upper longitudinal edges of the side walls. The drive shafts are driven by a hand-operated chain drive. However, U.S. Pat. No. 6,402,223 B2 regards this swivel mechanism as relatively cumbersome and disadvantageous. The suggested alternative is a system where both roof segments are operated by means of four link rods, with two link rods being rigidly attached to each drive shaft.

A vehicle with a powered swivel mechanism is also familiar from DE 10 2007 043 818 B4.

SUMMARY OF THE INVENTION

The invention is based on the aim of improving the swivel mechanism in such a way that the cover system completely uncovers the load area when in open position, and the swivel mechanism essentially prevents any widening of the vehicle when in closed position.

As per the invention, this aim is solved through the characteristics of claim 1.

The vehicle as per the invention features a load-carrying structure that is limited by end and side walls and is open at the top and a cover system to cover the load-carrying structure when in closed position, and uncover it when in open position, with the cover system comprising at least one roof segment that can be swivelled between closed position and open position using at least one swivel mechanism. The swivel mechanism features at least one drive shaft, with the roof segment being rigidly attached to the drive shaft. A drive to turn the drive shaft is also intended. The drive shaft is rotatably secured to at least two swivel levers, with the swivel levers being able to be swivelled on a shared swivel axis, thus moving the drive shaft between its position on the upper longitudinal edge of one of the two side walls and a position that is laterally spaced from the side wall, and aligning the shared swivel axis with the upper longitudinal edge of one of the two side walls.

Aligning the shared swivel axis with the upper longitudinal edge of the side wall allows the swivel mechanism to be designed in such a way that when in closed position it essentially does not protrude beyond the side walls, and when in open position it fully uncovers the load-carrying structure. The length of the swivel lever is such that when in open position the roof segment can be fully lowered down beside the corresponding side wall, with the gap between the roof segment and side wall being as small as possible. This results in a very streamlined construction when open.

Further configurations of the invention form the subject of the sub-claims.

The drive for the drive shaft will preferably comprise a rack and pinion drive with a toothed rack, with the rack being in effective connection with a toothed wheel that is rigidly attached to the drive shaft to open and close the roof segment. At one of its ends, the rack and pinion drive can be connected to the wheel of the drive shaft by means of its rack, and at its opposite end, it can be flexibly secured in the region of one of the end or side walls. For convenience, the drive features a double-action actuation cylinder to drive the rack.

The at least one roof segment will preferably be beside one of the two side walls when in open position. Furthermore, two roof segments can be provided, arranged like a pitched roof when in closed position. The two roof segments may also partially overlap. In this case, each roof segment may have its own swivel mechanism.

As per the preferred configuration of the invention, each swivel lever has the shared swivel axis at one end, and a sleeve-like mount for the drive shaft at the other. The drive shaft is rotatably secured in this sleeve-like mount; lubrication may also be used. The drive shaft should preferably be secured in the sleeve-like mount with a set rotational range of between 90° and 180°, limited by at least one end stop. An optional configuration is for the end stop to be rigidly fixed to the drive shaft, with the relative rotatory movement between the drive shaft and the sleeve-like mount being limited by a recess in the sleeve-like mount. Furthermore, the drive shaft's swivelling movement between open and closed position can be limited by flexible buffer elements.

BRIEF DESCRIPTION OF THE DRAWINGS

Further benefits and configurations of the invention are explained in more detail below, using the description and drawing.

In the drawings

DETAILED DESCRIPTION OF ILLUSTRATIVE EMBODIMENTS

Figure 1:
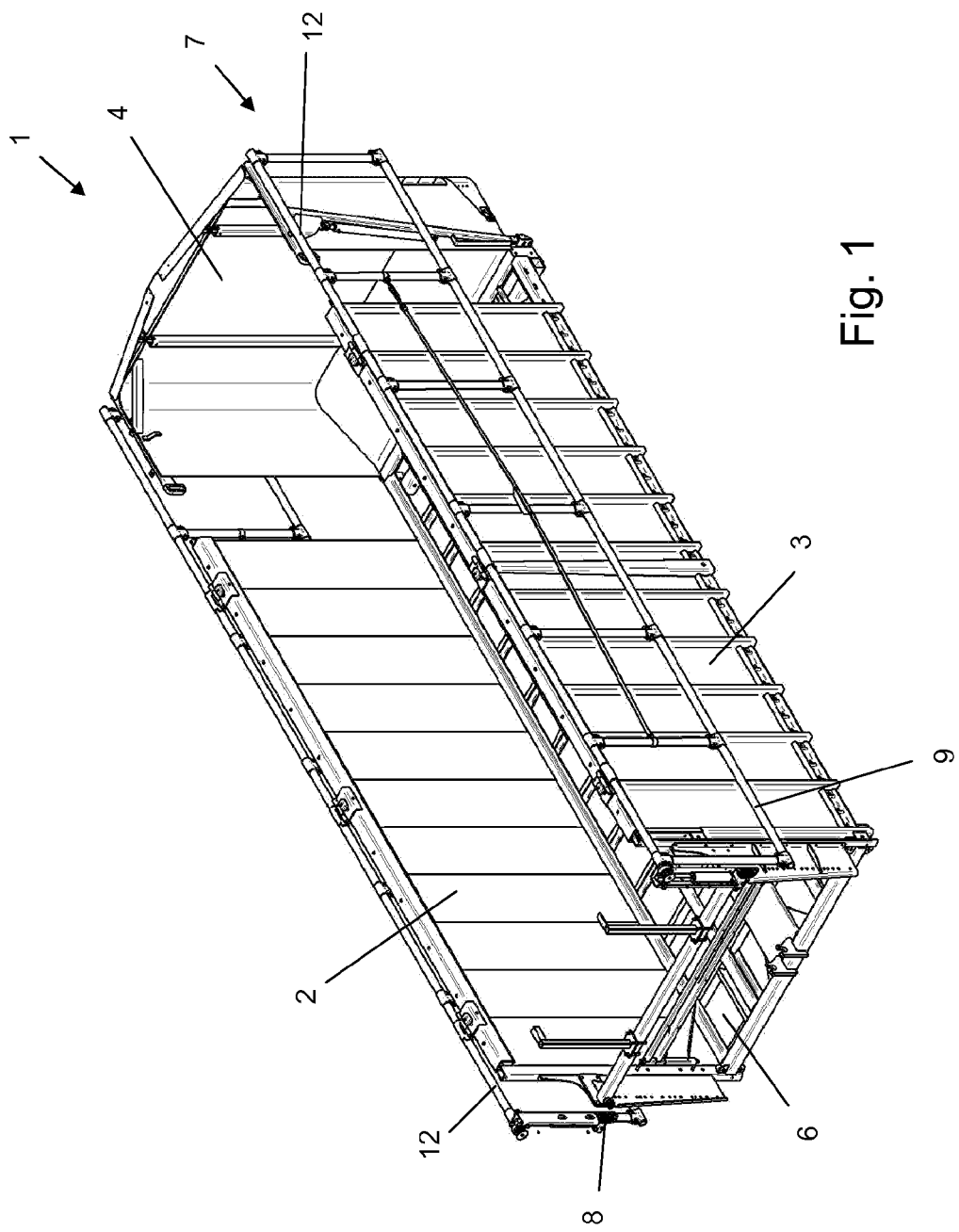
FIG. 1 is a three-dimensional illustration of the load-carrying structure in open position.

The load-carrying structure (1) pictured in FIG. 1 is intended to be on a vehicle, particularly a trailer or lorry, which is not shown. It essentially comprises two side walls (2 and 3), a rear end wall (4), a front end wall, which is not shown, and a floor (6). The load-carrying structure is also open at the top, so that it can be loaded, for example with agricultural cuttings. The front end wall may, for example, be designed as a sliding wall. The floor (6) may also have a sliding design.

In order to protect the load, a cover system (7) is also intended, comprising two roof segments (8, 9) and a swivel mechanism (10). The roof segments each have a reinforced frame, equipped with a fabric tarpaulin or other flat, light cover, which is not shown. The two roof segments (8, 9) are arranged and designed in such a way that they overlap slightly in the region of the longitudinal median plane when in closed position as per FIG. 9, so that the load-carrying structure is completely rain-tight.

Figure 3:
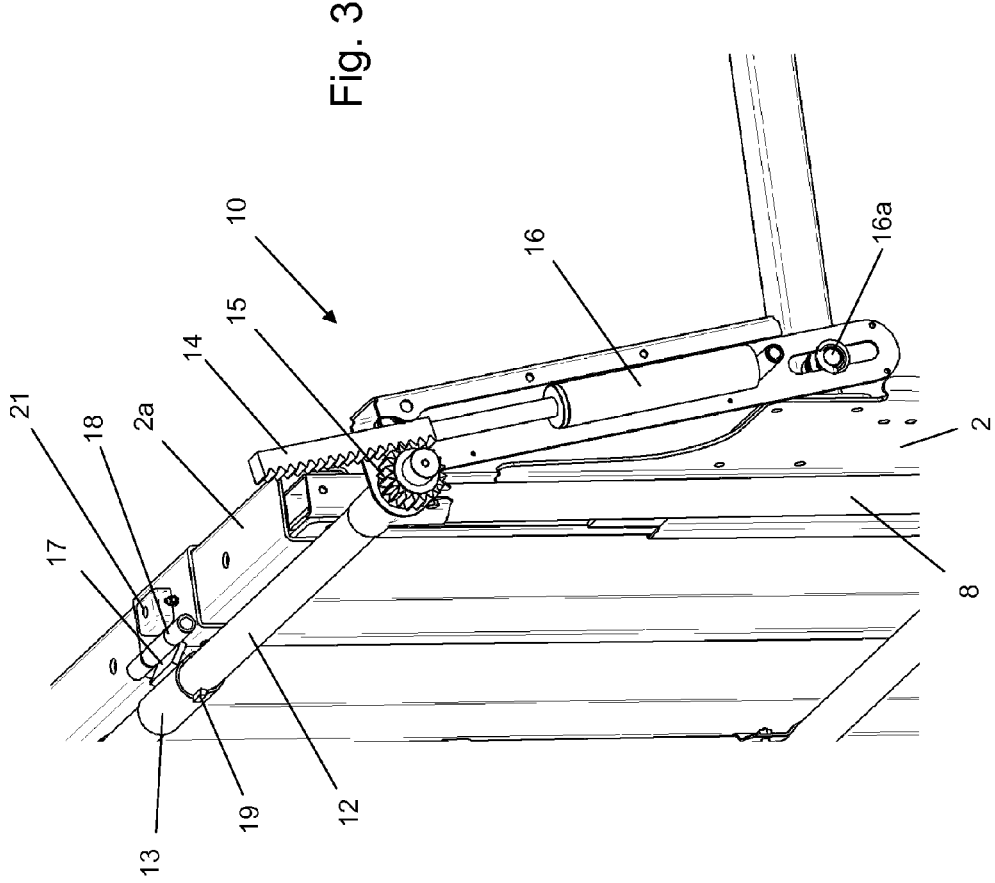
FIG. 3 is a three-dimensional illustration of the swivel mechanism as per FIG. 2.
Figure 4:
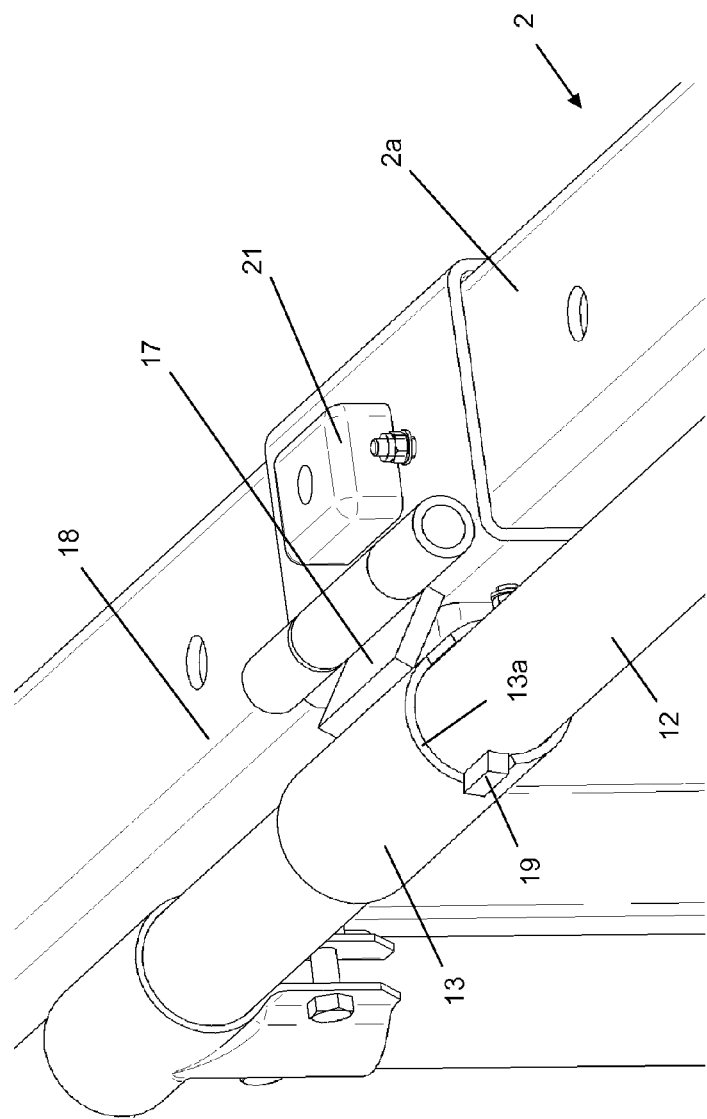
FIG. 4 is a three-dimensional detailed view in open position.

Each roof segment (8, 9) is rigidly attached to a drive shaft (12) at its outer longitudinal edge; the drive shaft is rotatably secured in sleeve-like mounts (13) in the region of the upper longitudinal edge of each side wall (2, 3). Each drive shaft (12) has a corresponding swivel mechanism (10), comprising a rack and pinion drive with a toothed rack (14), which is in effective connection with a toothed wheel (15) that is rigidly attached to the drive shaft (12) to open and close the corresponding roof segment (FIGS. 3 and 4). A double-action actuation cylinder (16) is also provided, which can be used to move the rack (14) in both directions. The actuation cylinder (16) is flexibly secured at a joint (16a) in the region of the front end wall (5). The movement of the rack (14) causes the drive shaft (12) to rotate, and thus opens or closes the corresponding roof segment.

Figure 2:
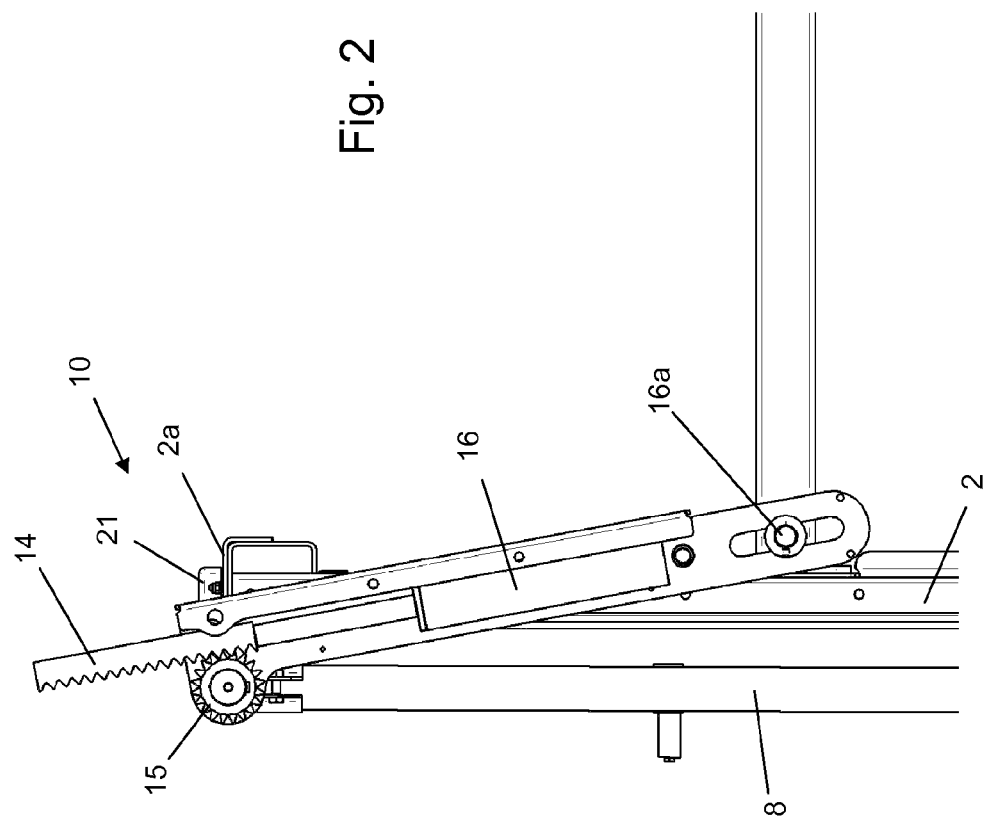
FIG. 2 is a diagram side view of the swivel mechanism in open position.

The flexible placement of the actuation cylinder (16) is necessary because the drive shaft (12) is not completely fixed into the sleeve-like mounts (13); rather, the mounts (13) are aligned with swivel levers (17), as can be seen in FIGS. 3 and 4. The swivel levers (17) are able to swivel on a swivel axis (18), this moving the drive shaft (12) between its position on the upper longitudinal edge (2a) of the side wall (2) (FIGS. 7 and 8) and a position that is laterally spaced from the side wall (2) as per FIGS. 2 to 4. The swivel lever (17) is thus like a type of hinge, which moves on the swivel axis (18). There should preferably be at least two such swivel levers along the length of the side wall. The swivel lever (17) is thus attached to the swivel axis (18) at one end, and has the sleeve-like mount (13) for the drive axis at its other end. Swivelling the swivel lever (17) therefore causes the drive shaft (12) to swivel. The drive shaft (12) is also rotatably aligned in the sleeve-like mount (13), with the rotational range being limited by an end stop (19) that is rigidly attached to the drive shaft (12); the sleeve-like mount (13) has a recess (13a) (FIG. 4), within which the end stop (19) has limited movement. The relative rotational range for the end stop (19) in the recess (13a) should preferably be more than 90° but less than 180°.

Figure 5:
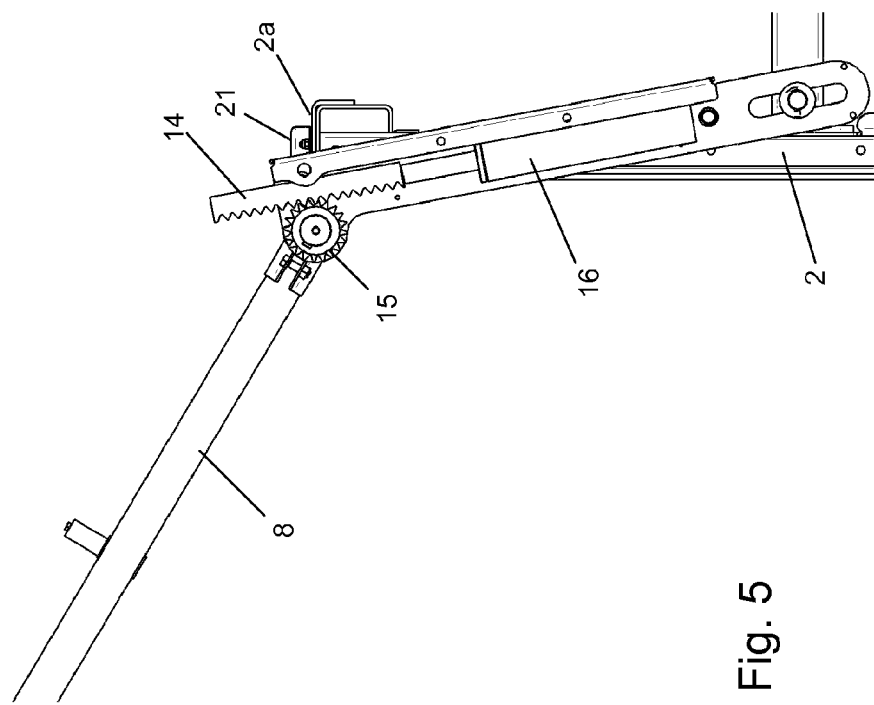
FIG. 5 is a side view of the region of the swivel mechanism in a first intermediate position.
Figure 6:
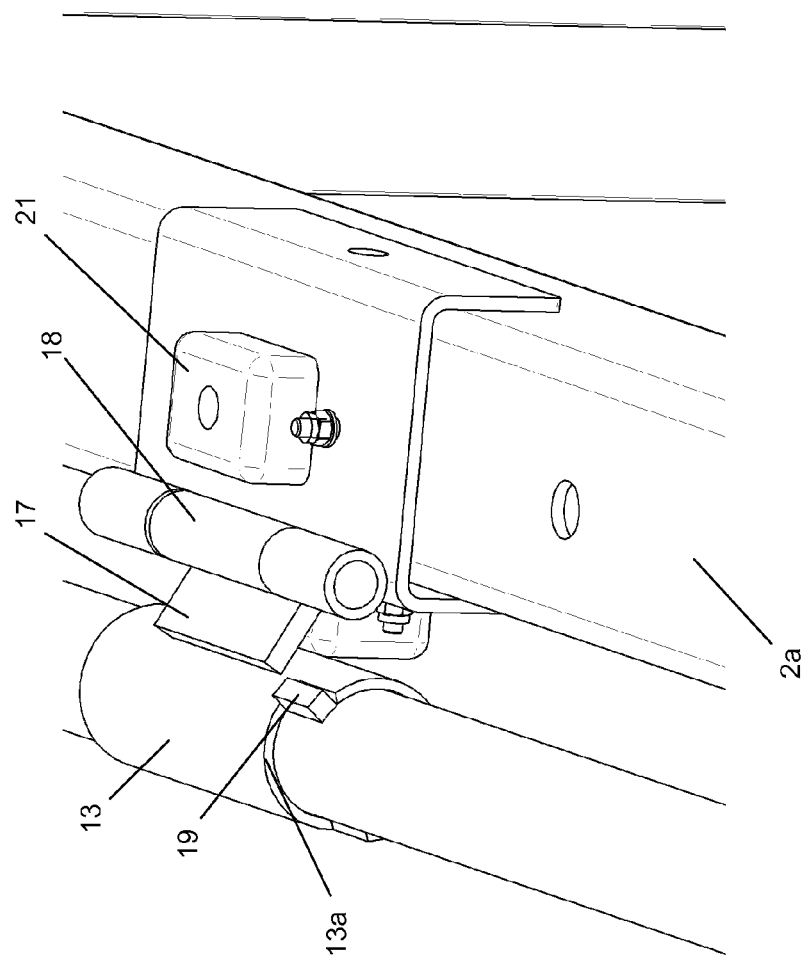
FIG. 6 is a three-dimensional detailed view in the first intermediate position.
Figure 9:
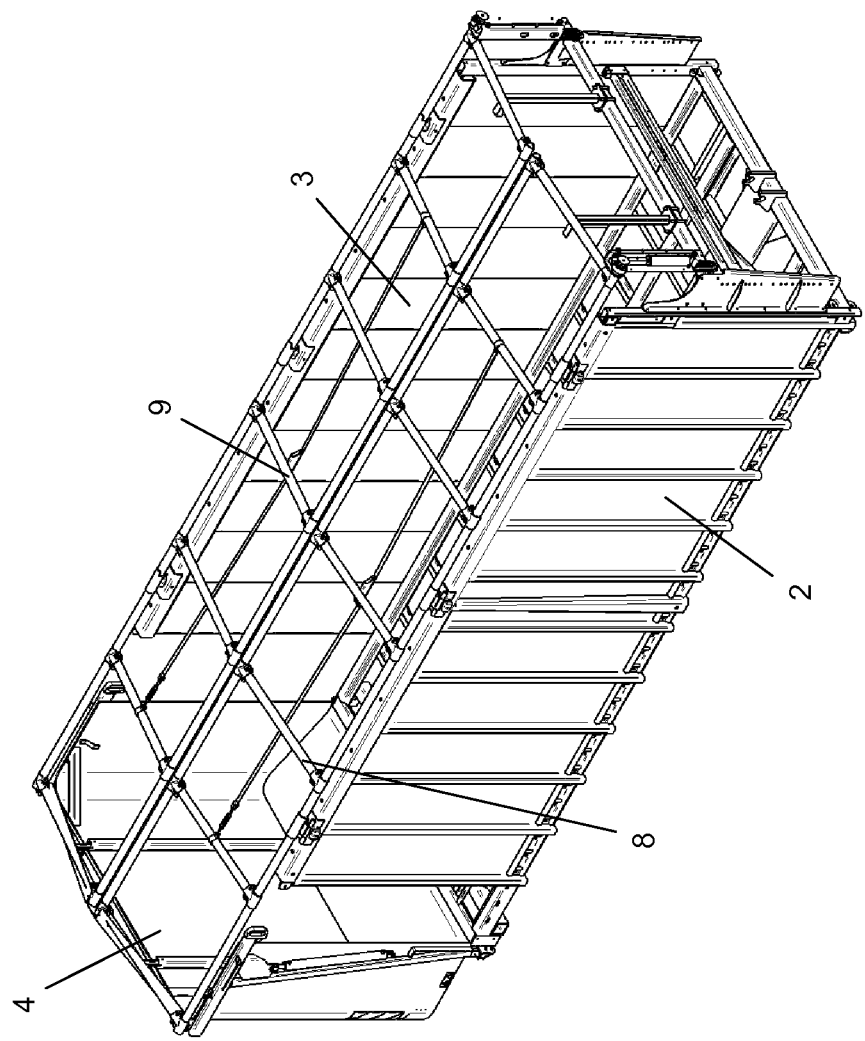

In order to move the roof segments from the open position shown in FIGS. 1 to 4 to the closed position shown in FIG. 9, the actuation cylinder (16)—which is extended in open position—must be retracted, whereby first the drive shaft (12) turns in the sleeve-like mount until the end stop (19) of the position shown in FIG. 4 stops at the other limit of the recess (13a) as per FIG. 6. FIGS. 5 and 6 show the resulting intermediate position of the roof segment (8).

Figure 7:
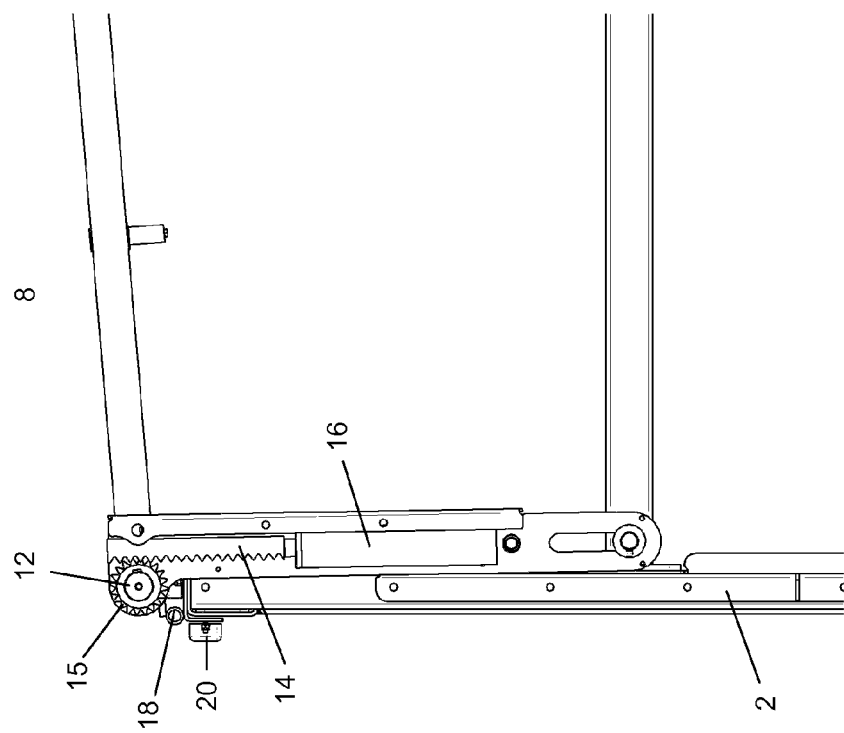
FIG. 7 is a diagram side view of the swivel mechanism in closed position.
Figure 8:
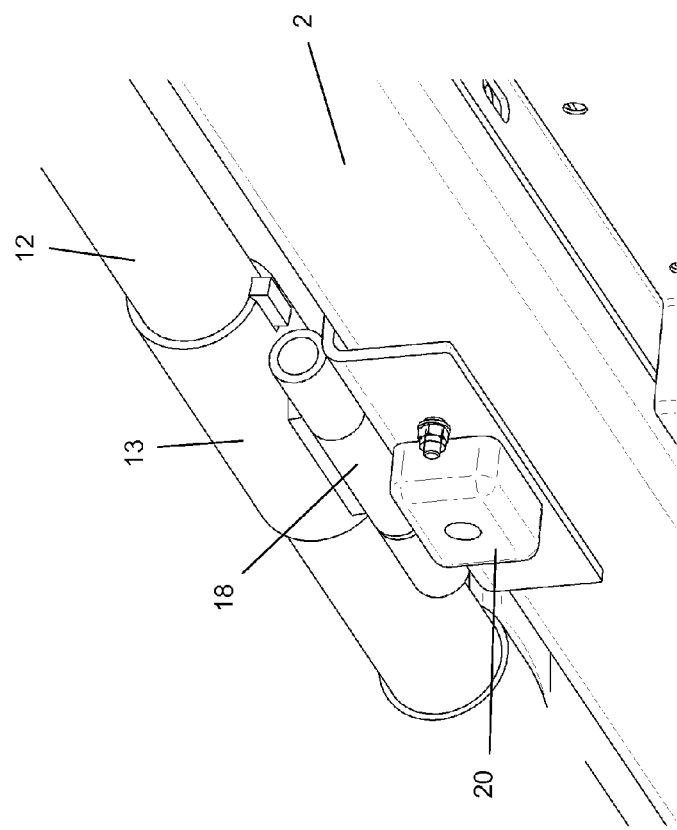
FIG. 8 is a three-dimensional detailed view in closed position and FIG. 9 is a three-dimensional illustration of the load-carrying structure in closed position.

If, starting from this intermediate position, the actuation cylinder (16) is retracted further, the end stop (19) takes the sleeve-like mount (13) with it, causing the swivel lever (17) to swivel on its swivel axis (18) until the closed position as per FIGS. 7 to 9 is reached. To open the roof segment, the actuation cylinder is operated in reverse. In order to guarantee a soft stop for the roof segments in open or closed position, flexible buffer elements (20, 21) are provided.

FIGS. 1 to 4 clearly show that the load area, which is limited by the side walls, is freely accessible when in open position, and is not in any way restricted by the swivel mechanism. In addition, the drive axis (12) is only swivelled outward by the swivel lever (17) to such an extent that the roof segment (8) can be swivelled downward, with the distance between the roof segment (8) and the side wall (2) being as small as possible in order to facilitate the construction being as streamlined as possible, even in open position.

FIG. 7 shows that when the roof segments are in closed position, the drive axis (12) is in a position that is on or above the upper longitudinal edge (2a) of the side wall (2), meaning that the swivel mechanism essentially does not protrude beyond the side walls. In the configuration example shown, the flexible buffer element (20) represents the outermost component. However, this element can be designed in such a way that it is narrow. It may be that it can be foregone completely, for example by building a suitable buffer element into the roof segment.

The invention claimed is:

1. A vehicle comprising:
   a load-carrying structure that is limited by end walls and two side walls, the load-carrying structure being open at the top;
   a cover system to cover the load-carrying structure when in a closed position, and uncover the load-carrying structure when in an open position, with the cover system comprising at least one roof segment that can be swivelled between the closed position and the open position using at least one swivel mechanism;
   wherein the swivel mechanism
      has at least one drive shaft,
      the roof segment is rigidly attached to the drive shaft,
      the drive shaft is coupled with a drive to turn the drive shaft,
      the drive shaft is rotatably secured to at least two swivel levers, with the at least two swivel levers being able to be swivelled on respective swivel axes, thus moving the drive shaft between a position on an upper longitudinal edge of one of the two side walls and a position that is laterally spaced from the side wall, and
   the swivel axes are aligned with the upper longitudinal edge of one of the two side walls.

2. A vehicle as per claim 1, characterised in that the drive comprises a rack and pinion drive with a toothed rack, with the toothed rack engaging with a toothed wheel that is rigidly attached to the drive shaft to open and close the roof segment.

3. A vehicle as per claim 2, characterised in that the rack and pinion drive is connected to the wheel of the drive shaft through the toothed rack at one end, and is flexibly secured at an opposite end proximate one of the end walls or one of the two side walls of the load-carrying structure.

4. A vehicle as per claim 2, characterised in that the drive has a double-action actuation cylinder to drive the rack.

5. A vehicle as per claim 1, wherein the at least one roof segment is beside one of the two side walls when in the open position.

6. A vehicle as per claim 1, characterised in that two roof segments are provided and provide a pitched roof structure when in the closed position.

7. A vehicle as per claim 6, characterised in that the two roof segments partially overlap when in the closed position.

8. A vehicle as per claim 6, characterised in that each roof segment has a swivel mechanism.

9. A vehicle as per claim 1, characterised in that each swivel lever has the swivel axis at one end and a sleeve-like mount for the drive shaft at the other end.

10. A vehicle as per claim 9, characterised in that the drive shaft can be rotated in the sleeve-like mount within a set rotational range limited by at least one end stop.

11. A vehicle as per claim 10, characterised in that the end stop is rigidly attached to the drive shaft, and the relative rotatory movement between the drive shaft and the sleeve-like mount is limited by a recess in the sleeve-like mount.

12. A vehicle as per claim 1, characterised in that movement of the drive shaft between the open position and the closed position is limited by flexible buffer elements.

\* \* \* \* \*